Figure 2:
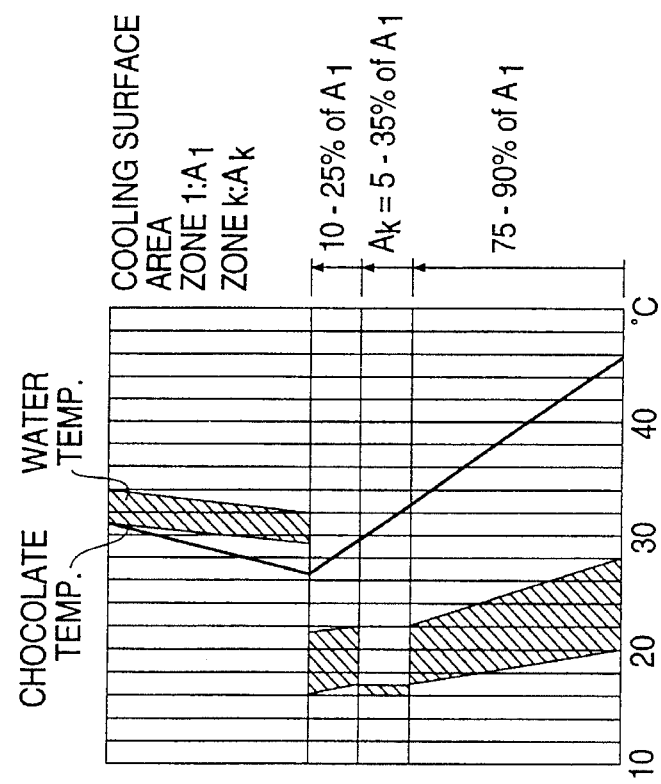

United States Patent [19]
Aasted

[11] Patent Number: 5,514,390
[45] Date of Patent: May 7, 1996

[54] METHOD AND AN APPARATUS FOR CONTINUOUS TEMPERING OF CHOCOLATE-LIKE MASSES

[75] Inventor: Lars Aasted, Charlottenlund, Denmark

[73] Assignee: Aasted-Mikroverk ApS, Denmark

[21] Appl. No.: 255,783

[22] Filed: Jun. 9, 1994

[30] Foreign Application Priority Data

Jun. 3, 1994 [DK] Denmark ................... 0632/94

[51] Int. Cl.$^6$ .............. A23G 1/00; B23Q 15/00
[52] U.S. Cl. ............... 426/231; 99/348; 99/486; 426/519; 426/524; 426/660
[58] Field of Search .................. 426/231, 233, 426/519, 660, 524; 99/348, 486

[56] References Cited

U.S. PATENT DOCUMENTS

| 4,859,483 | 8/1989 | Sollich | 426/660 |
| 5,188,853 | 2/1993 | Sollich | 426/231 |

FOREIGN PATENT DOCUMENTS

| 2536063 | 9/1977 | Denmark . |
| 3913941C1 | 4/1990 | Denmark . |
| 0394721 | 10/1990 | European Pat. Off. . |
| 0472886 | 3/1992 | European Pat. Off. . |
| 0289849 | 8/1992 | European Pat. Off. . |
| 261118 | 4/1949 | Switzerland . |
| 9200015 | 1/1992 | WIPO . |

OTHER PUBLICATIONS

Confectionary Production, vol. 54, No. 5, May 1988 Surbiton.

Primary Examiner—George Yeung
Attorney, Agent, or Firm—Finnegan, Henderson, Farabow, Garrett & Dunner

[57] ABSTRACT

The present invention concerns a method and an apparatus (1) for continuous tempering of chocolate-like masses, said apparatus (1) comprising at least two cooling zones (Z1, Zk) and a subsequent reheating zone (Z2) for the mass. Each of the zones has its own separately controllable cooling medium circuit and heating medium circuit, respectively (10, 11 and 12, respectively) for controlling temperature and/or flow amount of the cooling medium and the heating medium. A first cooling zone (Z1) comprises initial and final cooling surfaces (A1' and A1"), between which the cooling surfaces (Ak) of a second cooling zone (Zk) are positioned, seen in the flow direction (M) of the mass. In operation, the cooling surfaces (Ak) of the second cooling zone (Zk) can constitute the crystallization zone. It is hereby possible to control the tempering process and in particular the heat energy transport in a defined zone, such as the crystallization zone, to obtain a predetermined number of stable β-crystals in the mass. Further, a particularly simple, compact and efficient apparatus in relation to its dimensions is provided.

10 Claims, 2 Drawing Sheets

METHOD AND AN APPARATUS FOR CONTINUOUS TEMPERING OF CHOCOLATE-LIKE MASSES

The present invention concerns a method and an apparatus for continuous tempering of a flowing, fat-containing chocolate-like mass, said apparatus comprising at least two cooling zones having a plurality of cooling surfaces, and a subsequent reheating zone having a plurality of heating surfaces for the mass, seen in the flow direction of said mass, each cooling zone and heating zone comprising an associated, separately controllable cooling medium circuit and heating medium circuit having sensors for measuring medium and/or mass temperature as well as an associated control unit for controlling temperature and/or flow amount of the cooling medium and the heating medium during the passage thereof across the cooling surfaces and heating surfaces of the zone concerned and a first cooling zone of said zones comprising initial and final cooling surfaces, seen in the flow direction of the mass.

Devices of this type have been known for a large number of years, and their basic structure still corresponds to the first devices which were marketed protected by a plurality of patents, including CH-B-261 118. All of the devices have a structure with mass chambers and medium compartments which are arranged alternately on top of each other, and which are separated by intermediate plates having the cooling or heating surfaces concerned at opposed mass sides and medium sides, respectively. The mass is pumped continuously through the mass chambers and is mixed and distributed over the surfaces by means of mixing blades mounted on a through drive shaft. Both mass chambers and medium compartments, in particular cooling medium compartments, have been provided with thermometers, as described in the CH patent specification, so that the development in the cooling of the mass in the tempering machine can be monitored exactly. A heater has simultaneously made it possible to adjust the temperature of the cooling water accurately for the cooling medium compartment concerned. All the separately controllable cooling or heating medium circuits are usually connected with a common medium inlet and outlet. Further, the devices may also include a common pump which applies pressure to the circuits. However, nowadays the devices are frequently provided with a pump in each separate circuit.

In the operation of the tempering devices at the manufacturers of articles made of a tempered mass, usually at least one cooling section has been set to maintain a constant cooling water temperature. In practice, large amounts of cooling water having a temperature corresponding to the important crystal formation temperature of the chocolate mass concerned were conveyed through the cooling zone. It was believed that when passing the cooling surfaces of the cooling zone concerned, the mass would be cooled to the cooling water temperature concerned with certainty so that the formation of the important stable β-crystals took place precisely in the zone concerned. Thus, in practice the temperature was set according to the crystal formation temperature of the mass concerned. It is common to the known devices having the said basic structure corresponding to the apparatus described in the CH patent that temperature and/or flow amount of the cooling medium in any cooling zone—which is not the first cooling zone, seen in the flow direction of the mass—can be controlled and in particular to achieve a constant cooling medium temperature independent of the temperature and amount of the mass which flows through the apparatus. The said cooling zone will in practice constitute precisely the crystal formation zone.

Particularly during the last decade the manufacturers of the tempering devices concerned have focused on developing control methods aiming at providing a higher degree of a predetermined number of stable β-crystals in the mass. Thus, EP-B-289 849 describes the use of known heat exchanger technology in connection with sophistication of constructional details of a tempering apparatus to obtain an asserted better control of the tempering process. However, in practice the industry has been aware of the influence of the mentioned factors on the tempering process and has taken these into consideration in the construction of their devices.

However, it is common to the knowledge accumulated by the industry concerning the operation of the tempering machines that it has always been decided to provide the crystal formation zone in the last final cooling zone prior to the subsequent reheating zone. At the same time, when passing through the preceding cooling zone or zones, the mass is caused to assume a state in which it is "close to" the crystal formation temperature. Thus, EP-0 472 886 A1 describes a tempering apparatus in which the crystal formation zone is terminated in a well-defined manner at the transition from the last cooling zone to the subsequent reheating zone. It is moreover described that from its termination the crystal formation zone spreads more or less in a direction toward the flow direction of the mass in response to the amount of the flowing mass and/or the inlet temperature thereof. It is stated in this EP document that the flow amount and/or the temperature of the cooling medium in one or more of the initial zones can be controlled by means of a control unit, which measures the temperature of the chocolate mass at the end of the crystal formation area. However, what is involved is a form of feedback control which, as found by a skilled person, has a very long reaction time before "equilibrium" is obtained again, and the desired temperature of the chocolate mass is reached before it passes into the crystal formation region. The document provides no teachings on how to achieve separate control of the heat energy transport in the crystal formation region, which is so important for the formation of β-crystals.

In the known devices in which the crystal formation zone is always included precisely in the final cooling zone before the reheating zone, it has been found to be difficult in practice to predetermine the extent and in particular the termination of the crystal formation zone accurately. The inventor of the present invention, however, has realized that in operation heat interference between the reheating zone and the "termination" of the crystal formation zone means that in reality the crystal formation zone is undefined and frequently spreads somewhat into the reheating zone. The fluctuating extent of the crystal formation zone in both directions also involves uncertainty with respect to the heat energy transport in the crystal formation zone, which is actually the factor it is attempted to control.

When developing the present method and apparatus, the inventor has departed from the traditional customary line of thought among skilled persons in the field and has aimed at a controlled provision of a zone, and in particular the crystal formation zone at a location in the apparatus where a zone, in particular the outer boundaries of the zone, is maintained to a greater degree than in the known devices to obtain better control of the heat energy transport between cooling medium and mass in the zone.

The method of the present invention is thus characterized in that the control unit for a second cooling zone of said zones, whose cooling surfaces are positioned before the final cooling surfaces of said first cooling zone, seen in the flow direction of the mass, is controlled for constant provision of a cooling medium temperature and/or cooling amount, which is sufficient for the mass concerned to provide stable β-crystals in the mass during its passage across the said cooling surfaces of the second cooling zone. Hereby the necessary heat energy transport, which is to take place constantly to provide the desired β-crystals in the mass, can be controlled accurately, which is extremely surprising to these skilled in the field.

The apparatus of the invention is characterized in that the cooling surfaces of a second cooling zone of said zones are inserted between the initial and final cooling surfaces of the first zone, seen in the flow direction of the mass. A form of "envelope" or wrapping of the second zone will be provided in operation, which reduces the heat interference between the outer boundary of the cooling surfaces of the zone and the adjacent cooling surfaces in the first cooling zone. A cooling environment uniform per se is provided around the second zone, resulting in minimum heat interference between the surfaces. A sharper outer definition of the zone in operation and thus improved control of the heat energy transport are concomitant advantages.

A particularly expedient and efficient operation of the apparatus is achieved in particular when the second cooling zone of the apparatus is controlled to the necessary temperature and/or flow amount of cooling medium for a crystal formation region to be established in the zone.

A particularly simple and compact apparatus with respect to the dimensions of the apparatus is provided by the embodiment defined in claim 6 and/or claim 7.

In connection with the new apparatus of the invention the control unit for the said second cooling zone may be adapted to maintain a constant cooling medium temperature automatically in a combined embodiment.

It has been found particularly expedient according to the invention that the initial cooling surfaces of the first cooling zone constitute a value in the approximate range of between 75 and 90% of the entire total area of the cooling surfaces of the first cooling zone, in particular when the apparatus just comprises two cooling zones.

Figure 1:
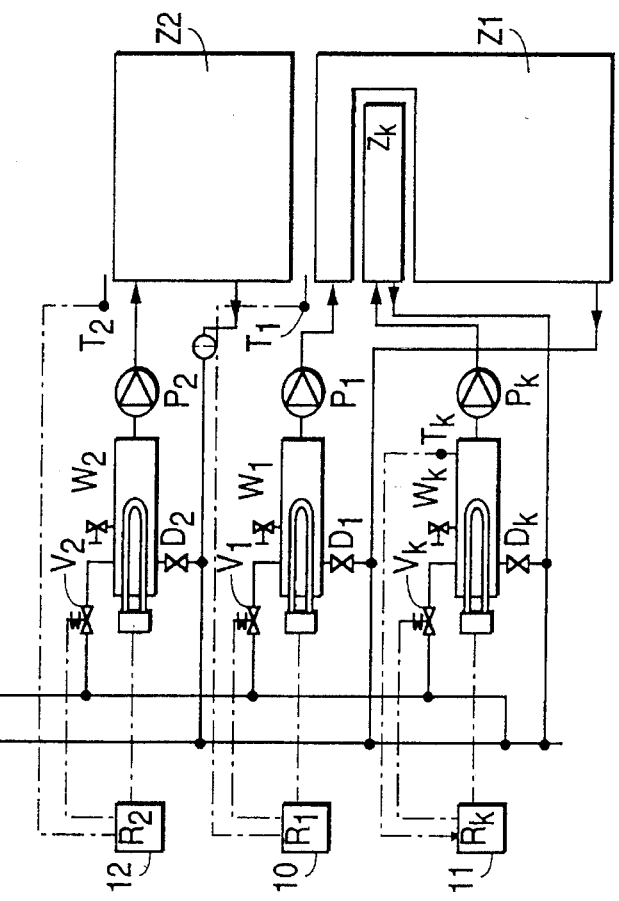
Figure 3:
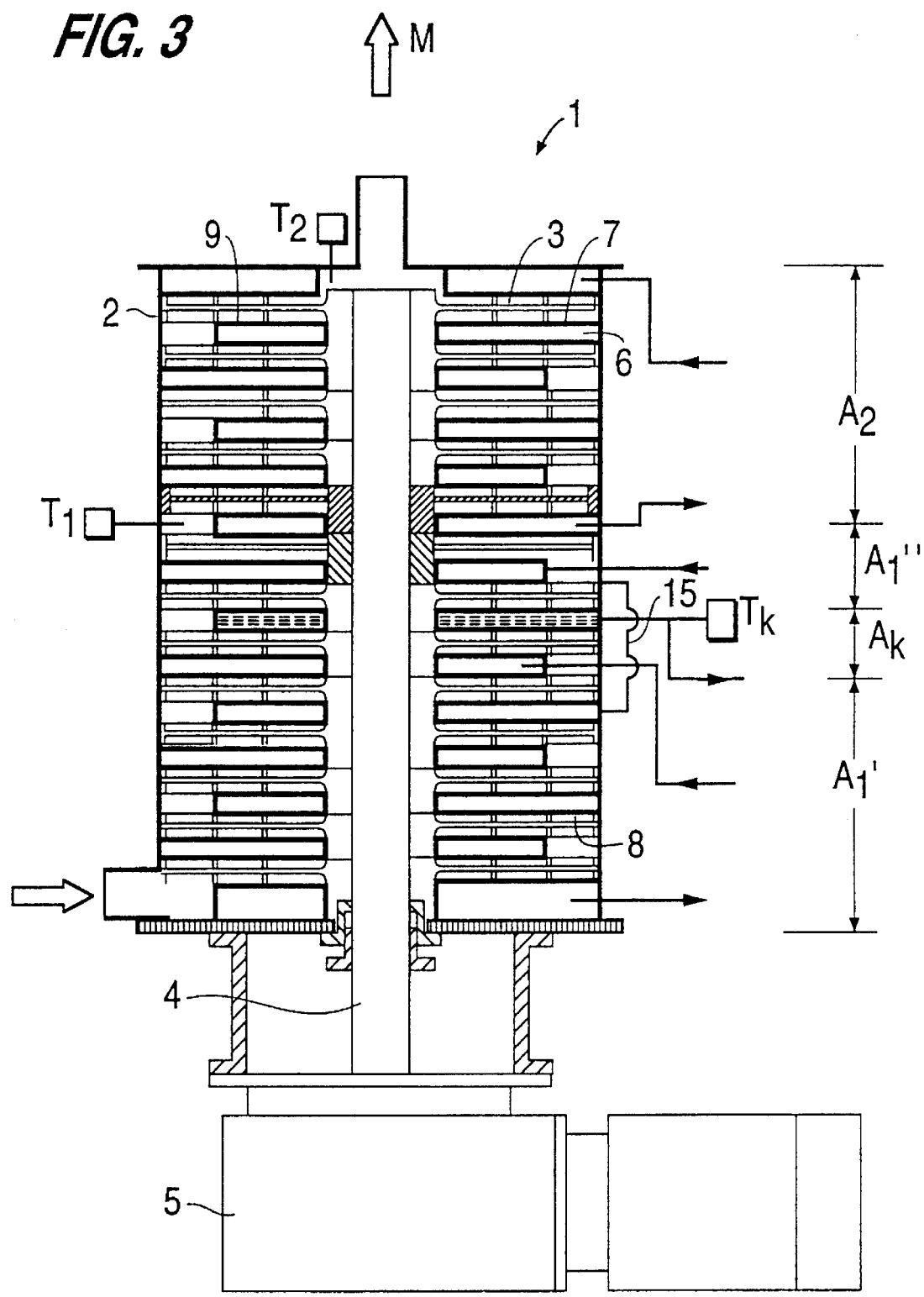

The invention will be explained more fully below with reference to a particularly preferred embodiment as well as the drawing, in which FIG. 1 is a schematic lateral view of a chocolate tempering appartus and a diagram of the associated cooling circuit and heating circuit, respectively, and associated control units, FIG. 2 is a schematic diagram of the temperature of the chocolate mass during its flow through the tempering apparatus as well as of intervals of the water temperature in the cooling circuits and the heating circuits, respectively, and FIG. 3 is a schematic view in vertical axial section of the structure of the chocolate tempering apparatus shown in FIG. 1.

The chocolate tempering apparatus 1 shown in FIGS. 1 and 3 comprises a plurality of separate treatment sections 2 which are arranged on top of each other and are interconnected, and through which the chocolate mass flows in a horizontal direction under the action of stirring and mixing blades 3. The mixing blades 3 are rotated by means of a vertical through shaft 4 which is driven by a motor 5.

The treatment sections 2 are separated by intermediate heat transport sections 6 through which water flows with a view to adding or removing heat from the chocolate mass through partitions 7 between heat transport sections 6 and adjacent treatment sections 2.

The treatment sections 2 and intermediate heat transport sections 6 of the chocolate tempering apparatus 1 constitute cooling zones Z1, Zk having a plurality of cooling surfaces 8 on the partitions 7 and constitute a subsequent reheating zone Z2 having a plurality of heating surfaces 9 on the partitions 7, seen in the flow direction M of the chocolate through the apparatus 1.

Each cooling zone Z1, Zk and heating zone Z2 comprises an associated, separately controllable cooling medium circuit 10, 11 and heating medium circuit 12 having sensors T1, T2 for measuring the chocolate temperature at the outlet of the zones Z1, Z2 as well as a sensor Tk for measuring the water temperature in the zone Zk.

The separately controllable cooling and heating circuits 10, 11 and 12, respectively, each comprise a heater W1, Wk and W2, respectively, and a valve V1, Vk and V2, respectively, for controlling the external cold water supply to the circuit concerned via an inlet conduit 13.

Each of the circuits 10, 11 and 12, respectively, also comprises a secondary valve D1, Dk and D2, respectively, for controlling the circulating cold water amount and hot water amount with respect to the amount which is optionally discharged via an outlet conduit 14. Each circuit 10, 11 and 12, respectively, comprises its own pump P1, Pk and P2, respectively, for maintaining the water circulation in the circuit in the embodiment shown.

The temperature sensors T1 and T2, respectively, for measuring the chocolate mass temperature at the outlet of the zone concerned are wired in the shown manner to an electronic control unit R1 and R2, respectively, which is wired to the heater W1 and W2, respectively, and valve V1 and V2, respectively, of the cooling circuit concerned 10 and 12, respectively. In the shown embodiment the electronic control units R1 and R2 are adapted to control the temperatures of the cooling water and the hot water, respectively, in the circuit concerned 10 and 12 in response to pre-entered temperature values to provide the desired chocolate temperature for the mass concerned.

The temperature sensor Tk for measuring the temperature of the circulating cooling water in the zone Zk is wired to an electronic control unit Rk, which is moreover wired to the heater Wk and the valve Vk. The temperature of the cooling water in the zone k can hereby be controlled to a constant level. However, in an embodiment (not shown) the electronic control unit Rk may be wired to the pump Pk as well as to a further temperature sensor (not shown) for measuring the chocolate mass temperature in the zone Zk with a view to providing a frequency-controlled pump flow in response to the measured chocolate mass temperature at the zone.

According to the invention the first cooling zone Z1 of the tempering apparatus 1 comprises initial and final cooling surfaces A1' and A1", respectively. Each of the cooling surfaces A1' and A1", respectively, is formed by a predetermined number of cooling surfaces 8, which, when the apparatus 1 is constructed, are selected by connection between predetermined heat transport sections 6 across which the cooling water passes in the separately controllable cooling circuit 10. The heat transport sections 6 comprising the cooling surfaces A1' and A1", respectively, are connected at 15. According to the invention the cooling surface area Ak of the zone Zk, which is formed by a predetermined number of cooling surfaces 8, is inserted between the initial and final cooling surfaces A1' and A1" of the first zone, seen in the flow direction M of the mass.

In the shown embodiment, the cooling surfaces Ak of the second cooling zone Zk are formed by cooling surfaces 8 on the partitions 7 of the heat transport sections 6, but it is contemplated within the scope of the invention that the cooling surfaces of the second cooling zone might equally well be formed by other surfaces, e.g. surfaces on the mixing blades of the shaft, flow openings or on the outer casing of the apparatus, as long as the cooling surfaces of the second cooling zone are inserted between the initial and final cooling surfaces of the first cooling zone. It has surprisingly been found in the operation of the apparatus that a form of "soft wrapping" or envelope of the second zone is provided, which reduces the heat interference between the outer boundary of the cooling surfaces of the zone and the adjacent cooling surfaces in the first cooling zone. A cooling environment uniform per se is provided around the second cooling zone, resulting in minimum heat interference with the adjoining surfaces. A sharper outer definition of the zone in operation and thus improved control of the heat energy transport are concomitant advantages. Further, a particularly compact structure of the tempering apparatus is obtained.

In the embodiment shown in FIGS. 1 and 3 the zone Zk is controlled to the necessary temperature and/or flow amount of cooling medium for a crystal forming region to be established in the zone. The "envelope" of the zone Zk has been found to reduce the heat interference between the cooling surfaces Ak and the adjacent cooling surfaces A1' and A1", respectively, in the first cooling zone Z1 in relation to the heat interference in the known tempering devices, which is a surprise to a skilled person. The operation of the new tempering apparatus 1 provides a better control of the heat energy transport in the crystal formation zone than in the known tempering devices and thus a better control of the tempering process, in particular in the important crystal formation zone. As a result, there will be a higher degree of a predetermined content of stable $\beta$-crystals, irrespective of the flow temperature and amount of the mass.

The diagram shown in FIG. 2 includes temperature ranges for measured water temperature in operation with various types of chocolate. It also shows the measured chocolate temperature during the passage of the chocolate through the tempering apparatus 1. Tests have shown that the initial cooling surfaces A1' of the first cooling zone Z1 may preferably constitute a value in the approximate range of between 75 and 90% of the entire total area of the cooling surface A1 of the first cooling zone, in particular when the apparatus just comprises two cooling zones Z1 and Zk. The area of the cooling surfaces Ak in the zone Zk preferably constitutes 5–35% of the area A1, see FIG. 2. However, the said ranges are not to be regarded as a limitation of the idea of the actual invention, since experiments have shown that the area ratios between the cooling zones should be adapted to the actual chocolate type and the associated operating conditions of the apparatus.

It should finally be mentioned that a particular advantage of the invention is that the existing tempering devices can be modified to the advantageous method of operation according to the invention in a particularly simple manner.

I claim:

1. A method of continuously tempering a flowing, fat-containing, chocolate mass which method comprises:
    (a) flowing said mass through at least a first cooling zone and a second cooling zone each having a plurality of cooling surfaces and a subsequent reheating zone having a plurality of heating surfaces, said first cooling zone comprising an initial group and a final group of said cooling surfaces and the cooling surfaces of said second cooling zone being positioned between said initial group and said final group of cooling surfaces of said first cooling zone, so that said mass flows serially across said initial group of cooling surfaces of said first cooling zone, the cooling surfaces of said second cooling zone, the cooling surfaces of said final group of cooling surfaces of said first cooling zone and the heating surfaces of said reheating zone;
    (b) separately controlling the flow of a cooling medium and a heating medium, respectively, through each of said cooling zones and said heating zone during passage of said mass across said cooling surfaces and said heating surfaces so as to control the temperature of said mass in each of said zones; and
    (c) controlling the temperature, the flow rate, or a combination of the temperature and flow rate of said cooling medium in said second cooling zone to form stable $\beta$-crystals in the mass during its passage across said cooling surfaces of said second cooling zone.

2. The method according to claim 1, wherein the temperature of the cooling medium in said second cooling zone is controlled to provide a substantially constant cooling medium temperature therein.

3. The method according to claim 1 or 2, wherein the temperature of the cooling medium in said second cooling zone is measured and the flow of the cooling medium in said second cooling zone is controlled in response to measured values of the cooling medium temperature.

4. The method according to claim 1, wherein the temperature of said mass in said second cooling zone is measured and the flow of the cooling medium in said second cooling zone is controlled in response to measured values of the temperature of said mass.

5. An apparatus for continuous tempering of a flowing fat-containing, chocolate mass, comprising at least two cooling zones having a plurality of cooling surfaces and a subsequent reheating zone having a plurality of heating surfaces, respectively, for cooling and heating the mass, each cooling zone, comprising an associated, separately controllable cooling medium circuit and having a sensor for measuring the medium or mass temperature and an associated control unit for controlling the temperature or flow of the cooling medium during the passage thereof across the respective cooling surfaces, said heating zone comprising an associated controllable heating medium circuit having a sensor for measuring the mass temperature and an associated control unit for controlling the temperature or flow of the heating medium during passage across said heating surfaces, a first of said cooling zones comprising initial and final cooling surfaces and wherein the cooling surfaces of a second of said cooling zones are inserted between the initial and final cooling surfaces of the first cooling zone.

6. An apparatus according to claim 5, wherein the final cooling surfaces of the first cooling zone are positioned in the flow path of the mass so as to be followed directly by said heating zone.

7. An apparatus according to claim 5, wherein the initial cooling surfaces of the first cooling zone are positioned so as to be the first cooling surfaces in the flow path of the mass.

8. An apparatus according to claim 5, wherein the sum of the areas of the initial cooling surfaces of the first cooling zone constitutes a value in the approximate range of between 75 and 90% of the entire total area of the cooling surfaces of the first cooling zone.

9. An apparatus according to claim 5, wherein the control unit for the said second cooling zone controls at least one of the cooling medium flow and temperature automatically in operation to maintain a substantially constant cooling medium temperature during the passage of the medium across the cooling surfaces of the second cooling zone.

10. An apparatus according to claim 5, further including additional sensors in said second cooling zone for measuring the surface temperature of the cooling surfaces.

* * * * *